(12) United States Patent
Mitevski et al.

(10) Patent No.: US 11,636,512 B1
(45) Date of Patent: Apr. 25, 2023

(54) INVENTORY MANAGEMENT SYSTEM PROTECTION FOR NETWORK TRAFFIC SURGE RESISTANT PLATFORM

(71) Applicant: Fevo, Inc., New York, NY (US)

(72) Inventors: Vladimir Mitevski, New York, NY (US); Ari Daie, New York, NY (US)

(73) Assignee: Fevo, Inc., New York, NY (US)

( * ) Notice: Subject to any disclaimer, the term of this patent is extended or adjusted under 35 U.S.C. 154(b) by 0 days.

(21) Appl. No.: 17/865,989

(22) Filed: Jul. 15, 2022

(51) Int. Cl.
- G06Q 30/00 (2012.01)
- G06Q 30/0242 (2023.01)
- G06Q 10/087 (2023.01)
- G06Q 30/0601 (2023.01)

(52) U.S. Cl.
CPC ....... G06Q 30/0246 (2013.01); G06Q 10/087 (2013.01); G06Q 30/0641 (2013.01)

(58) Field of Classification Search
CPC .......... G06Q 30/0246; G06Q 30/0641; G06Q 10/087
See application file for complete search history.

(56) References Cited

U.S. PATENT DOCUMENTS

| | | | | |
|---|---|---|---|---|
| 10,846,691 B1* | 11/2020 | Girdhar | ........... | G06Q 20/387 |
| 11,288,697 B1* | 3/2022 | Sampey | ........... | G06Q 20/204 |
| 11,429,966 B1* | 8/2022 | Adam | ........... | G06Q 20/401 |
| 2003/0105672 A1* | 6/2003 | Epstein | ........... | G06Q 20/04 |
| | | | | 705/17 |
| 2005/0177442 A1* | 8/2005 | Sullivan | ........... | G06Q 10/087 |
| | | | | 705/16 |
| 2008/0114650 A1* | 5/2008 | Ku | ........... | G06Q 30/0213 |
| | | | | 705/14.23 |
| 2008/0114654 A1* | 5/2008 | McGrath | ........... | G06Q 30/0603 |
| | | | | 705/14.39 |
| 2011/0137706 A1* | 6/2011 | Howard | ........... | G06Q 30/0246 |
| | | | | 705/7.29 |
| 2011/0173095 A1* | 7/2011 | Kassaei | ........... | G06Q 30/02 |
| | | | | 705/26.7 |
| 2013/0092731 A1* | 4/2013 | Pettersson | ........... | G06K 19/08 |
| | | | | 235/375 |
| 2013/0124287 A1* | 5/2013 | Bjorn | ........... | G06Q 30/0222 |
| | | | | 705/14.23 |
| 2013/0138496 A1* | 5/2013 | Jin | ........... | G06Q 30/02 |
| | | | | 705/14.26 |
| 2013/0151323 A1* | 6/2013 | Shepard | ........... | G06Q 30/0222 |
| | | | | 705/14.23 |

(Continued)

*Primary Examiner* — Luis A Brown
(74) *Attorney, Agent, or Firm* — McDonald Hopkins LLC

(57) ABSTRACT

A network traffic surge resistant platform is described herein. An example system includes a network storage, and one or more servers configured as a commerce platform including an authentication manager. The commerce platform generates a first secret code and sends the first secret code via a first communication medium associated with a first identifier. The commerce platform also generates a second secret code and sends the second secret code via a second communication medium associated with a second identifier. In response to determining the first input code matching the first secret code and the second input code matching the second secret code, the commerce platform authorizes a transaction associated with a particular browser and associates the transaction with a customer record associated with both the first and second identifiers.

20 Claims, 10 Drawing Sheets

(56) References Cited

U.S. PATENT DOCUMENTS

| | | | |
|---|---|---|---|
| 2014/0074584 A1* | 3/2014 | Fisher | G06Q 30/0207 |
| | | | 705/14.39 |
| 2014/0257955 A1* | 9/2014 | Powell | G06Q 30/06 |
| | | | 705/14.23 |
| 2015/0248664 A1* | 9/2015 | Makhdumi | G06Q 20/3274 |
| | | | 235/380 |
| 2015/0295920 A1* | 10/2015 | Van Kerrebroeck | G06F 21/44 |
| | | | 726/9 |
| 2016/0042388 A1* | 2/2016 | Chater | H04L 67/535 |
| | | | 705/14.45 |
| 2017/0134385 A1* | 5/2017 | Mitevski | H04L 67/143 |
| 2017/0300960 A1* | 10/2017 | Khvostov | G06Q 30/0246 |
| 2017/0300961 A1* | 10/2017 | Khvostov | G06Q 30/0246 |
| 2018/0013840 A1* | 1/2018 | Mitevski | H04L 67/02 |
| 2018/0082054 A1* | 3/2018 | Khwaja | H04L 63/0428 |
| 2018/0137480 A1* | 5/2018 | Houghton, IV | G06F 1/1694 |
| 2019/0073729 A1* | 3/2019 | Cheng-Shorland | G06Q 30/0617 |
| 2019/0122203 A1* | 4/2019 | Kumawat | G06Q 20/382 |
| 2020/0394705 A1* | 12/2020 | Daie | G06Q 10/087 |
| 2021/0133760 A1* | 5/2021 | Lew | G06Q 20/425 |
| 2021/0288806 A1* | 9/2021 | Wakita | H04L 9/3242 |
| 2021/0390560 A1* | 12/2021 | Kojima | G06Q 20/3274 |
| 2022/0067733 A1* | 3/2022 | White | G06Q 20/3267 |
| 2022/0237647 A1* | 7/2022 | L'Huillier | G06Q 20/355 |
| 2022/0300970 A1* | 9/2022 | Mudumbai Srinivasa | G06K 19/06028 |

* cited by examiner

VERIFY YOUR INFO

Before we place your order, please verify you have provided correct info.

EMAIL: ehendrickson@email.com — 602A

MOBILE NUMBER: 202-555-0106 — 604A

FIRST NAME: Elias

LAST NAME: Hendrickson — 604B

602B

NEXT

MOBILE VERIFICATION

For security and privacy, please enter the 6 digit code we sent to this mobile number

MOBILE NUMBER: 202-555-0106 — 602A

G 6 X L 7 P — 606A

CONTINUE

Didn't receive a code? Resend

FIG. 6B

EMAIL VERIFICATION

For security and privacy, please enter the 6 digit code we sent to this email address

EMAIL ADDRESS ehendrickson@email.com

| X | 2 | 7 | B | H | 8 |

CONTINUE

Didn't receive a code? Resend

FIG. 6C

INVENTORY MANAGEMENT SYSTEM PROTECTION FOR NETWORK TRAFFIC SURGE RESISTANT PLATFORM

RELATED APPLICATIONS

This application is related to U.S. patent application Ser. No. 17/865,893 entitled "NETWORK TRAFFIC SURGE RESISTANT PLATFORM," filed on the same day, U.S. patent application Ser. No. 17/865,906 entitled "A DYNAMIC USER INTERFACE FOR A NETWORK TRAFFIC SURGE RESISTANT PLATFORM," filed on the same day, U.S. patent application Ser. No. 17/865,933 entitled "INVENTORY MANAGEMENT FOR A NETWORK TRAFFIC SURGE RESISTANT PLATFORM," filed on the same day, and U.S. patent application Ser. No. 17/865,951 entitled "INVENTORY MANAGEMENT SYSTEM PROTECTION FOR NETWORK TRAFFIC SURGE RESISTANT PLATFORM," filed on the same day, each of which is herein incorporated by reference in their entirety.

TECHNICAL FIELD

The present invention is generally related to webhosting of electronic commerce and, more specifically, management of surge network traffic to an electronic commerce platform.

BACKGROUND

Purchasing high demand goods and/or services, such as popular toys or event tickets, can be frustrating for consumers and potentially debilitating for electronic commerce platform providers. Increasingly, merchants use flash sales or other such events where all or part of the available inventory is, for a limited amount of time, offered to a group of people at a special price and/or is offered as an opportunity to purchase before the general public. Merchants may use such events to offer benefits to a particular group of customers (e.g., premium members, students, faculty, etc.), as a form of price differentiation, and/or to capture the attention of highly motivated customers, etc. Sometimes, instead of a preplanned event, consumer interest in a good or service is so high that a similar surge in traffic is generated upon an initial offer of the good or service. In such scenarios, instead of managing infrastructure (e.g., servers, databases, network bandwidth, etc.) for mean site traffic, the merchant's site must be configured to handle relatively infrequent surges of high network traffic volume that include a large number of requests into the merchant's backend infrastructure. For example, a flash sale can act like a denial of service attack, but where the traffic is legitimate. Often, backend systems, such as inventory management systems, are built with older technology that cannot handle the massive volume of queries into its databases. Such backend systems can be overwhelmed by these high traffic value events.

SUMMARY

Systems and methods for providing an electronic commerce platform that manages surges of high network traffic volume while protecting backend computing resources are described herein. For an offer of goods and/or services, the platform provider generates a static package that is placed in networked storage (e.g., networked object storage, etc.) that is accessible through a web service interface. The package contains the information required to instantiate and render the interface of the store, as well as information that is necessary to complete a transaction. When the offer is electronically communicated via a link, the linked location on the merchant platform's server includes just enough HTML instructions to retrieve the package from the storage and instantiate the interface. Based on the contents of the package, the interface of the merchant platform is then rendered in the browser of the customer using the processor and resources of the customer's computer (e.g., not resources of the servers of the merchant platform). During this process, the graphical elements of the interface may be retrieved from the networked storage. Based on the contents of the package, the rendered interface presents available inventory and performs cart management (e.g., presenting available inventory, selecting/deselecting goods and/or services to be placed in the cart, etc.) using resources of the customer's computer without making any calls to a server to query an inventory management system. The interface only performs backend calls (e.g., calls to the merchant platform server, etc.) when necessary to complete the next stage of the transaction (e.g., after the customer takes an affirmative step in the transaction). For example, when the customer clicks on an action button that signals that they desire to proceed with checking out, a call to an inventory server to query the relevant inventory management system(s) is made to place a temporary hold on the desired inventory. The rendered interface collects information to authenticate the identity of the customer and collects payment information. The interface then performs backend calls to the relevant system (e.g., the payments system, the customer management system, etc.) to verify the customer's information and process the payment. After, the payment is processed and the customer is identified, the merchant platform makes a call to the inventory management system to reserve the goods and/or services for the customer.

To authorize and identify a user, a user interface requests two identifiers from a user. The identifiers do not need to be present in that combination in a user database. The identifiers are linked to other methods of communicating with the user, such as a mobile number, an email address, and/or an instant messenger name, etc. The platform determines whether the identifiers are present in that combination in the user database. The user account is indexed to the combination of identifiers such that any account with either one of the two identifiers in combination with any other identifier would be a different account. Simultaneously with the account lookup, (i) the platform presents a first authorization challenge to the user based on the first identifier and (ii) sends a first one-time password (OTP) to the user via the first identifier. When the user correctly enters the first OTP into the authorization challenge interface, the platform presents a second authorization challenge to the user based on the second identifier and (ii) sends a second one-time password (OTP) to the user via the second identifier. When the user correctly enters the second OTP into the authorization challenge interface and when the user account exists that is associated with both identifiers, the platform authorizes the user and associates activity on the platform with the user. When the user correctly enters the second OTP into the authorization challenge interface and when the user account that is associated with both identifiers does not exist, the platform creates the account, authorizes the user, and associates activity on the platform with the user.

An example network traffic surge resistant system includes network storage, and one or more servers configured as a commerce platform that includes an authentication manager. The commerce platform generates a script, an offer package, and an offer instantiator and stores the script and the offer package onto the network storage. The offer instantiator provides the location of the script and the offer package in the network storage. In response to a browser operating on a computing device accessing the offer instantiator, the offer instantiator causes the browser to retrieve the script and the offer package from the network storage. In response to a signal from the commerce platform, the script, based on the offer package, causes the browser to instantiate an authorization interface to receive entry of first and second identifiers and first and second input codes. The authentication manager generates a first secret code and sends the first secret code via a first communication medium associated with a first identifier. The authentication manager also generates a second secret code and sends the second secret code via a second communication medium associated with a second identifier. In response to determining the first input code matching the first secret code and the second input code matching the second secret code, the authentication manager authorizes a transaction associated with a particular browser and associates the transaction with a customer record associated with both the first and second identifiers.

An example method to provide a surge resistant online platform includes generating, by the online platform including an authorization manager, a script, an offer package, and an offer instantiator, and storing the script and the offer package onto the network storage. The offer instantiator provides the location of the script and the offer package in the network storage. The method also includes retrieving, by a browser operating on a computing device at the direction of the offer instantiator, the script and the offer package from the network storage. The method includes, in response to a signal from the commerce platform, instantiating, by the script operating in the browser, an authorization interface to receive entry of first and second identifiers and first and second input codes. The method includes (i) generating, by the authorization manager or a first authorization service coupled to the authorization manager, a first secret code and send the first secret code via a first communication medium associated with the first identifier, (ii) generating, by the authorization manager or a second authorization service coupled to the authorization manager, a second secret code and send the second secret code via a second communication medium associated with the second identifier, (iii) and in response to determining the first input code matching the first secret code and the second input code matching the second secret code, authorizing, by the authorization manager, a transaction associated with the browser and associating the transaction with a customer record associated with both the first and second identifiers.

BRIEF DESCRIPTION OF THE DRAWINGS

Operation of the present disclosure may be better understood by reference to the following detailed description taken in connection with the following illustrations, wherein:

FIGS. 6A, 6B, and 6C illustrate an example authorization interface, according to the teachings of this disclosure.

DETAILED DESCRIPTION

Figure 1:
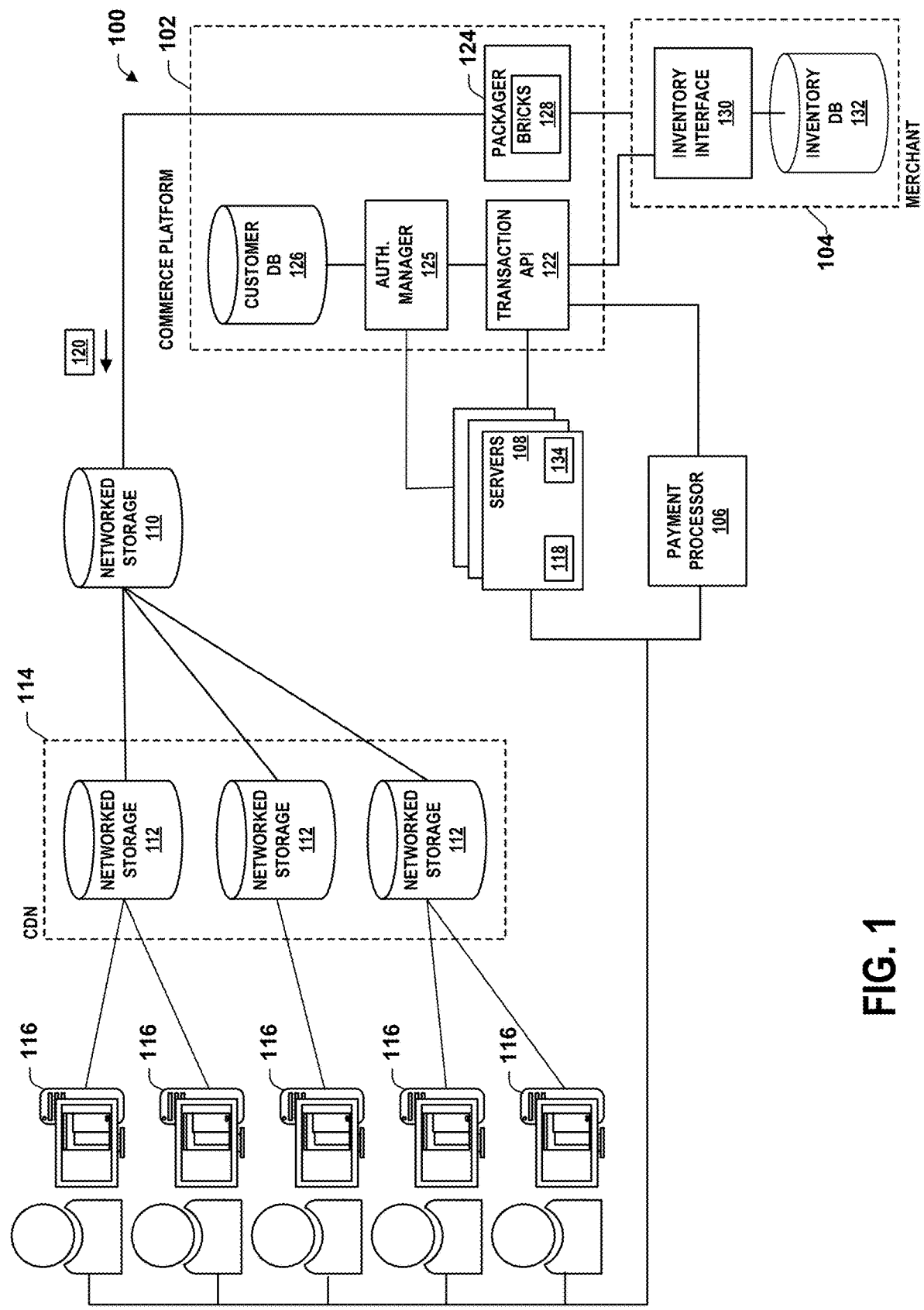
FIG. 1 is a block diagram of an example system to provide an electronic commerce platform to manage a surge network traffic, according to the teachings of this disclosure.

Reference will now be made in detail to exemplary embodiments of the present disclosure, examples of which are illustrated in the accompanying drawings. It is to be understood that other embodiments may be utilized, and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Commerce platforms that offer high demand and/or limited time offers for good and/or services often require backend systems (e.g., physical and/or virtual servers, databases, network bandwidth, etc.) that are deployed to meet or scale to surges in network traffic as a large number of customers simultaneously attempt to procure the goods and/or services. For example, platforms that handle ticket sales for major events (e.g., sports, concerts, etc.) often see such surges in network traffic as tickets are released. These surges can be orders of magnitude greater than the mean or ordinary network traffic and can overwhelm the commerce platform and its surrounding infrastructure with the flood of Internet traffic. Managing these sources can be costly and error prone, as it depends on recognizing the surge and differentiating the surge from illegitimate traffic (e.g., a denial of service attack, etc.). Additionally, in many cases, some backend systems, such as inventory management systems, are deployed using technology that is hard to scale (if even possible) and cannot handle the volume of requests necessary to service the traffic. For examples, generally scalability must be part of the design of a database and many inventory systems were deployed before scalability was required. This can lead to slowing, instability and/or termination of the operation of the ecommerce platform because the network and the backend system cannot cope or adapt quickly to the surge. Attempted techniques, such as queues and timed inventory reservation systems, etc., are often not effective in mitigating the effects of surge in the network traffic and can be used by malicious actors and/or undesirable consumers to deny some or all customers access to purchasing the good and/or services on the commerce platform. Accordingly, there are technical problems that prevent a commerce platform from being able to manage surges in network traffic volume without negatively affecting the backend systems that comprise the commerce platform.

Generally, platforms provide services that leverage a relationship with the user, such as having an account associated with the user that the user can log into. This allows interactions with the user to be tracked with a common identifier and track and interact with previous uses of the platform. For example, the identifier may be associated with transaction, biographical information, and/or fulfillment information, etc. Traditionally, an account is protected by a set of credentials (e.g., a username and password). When the account is created, the user supplies a username and a password, the password is hashed and the hashed password is stored in a database and is associated with the username. When a user logs into the account, the user supplies the username and a password attempt. The platform performs a database query to retrieve the hashed password and hashes the password attempt. If the hashed password and the hashed password attempt match, the platform authorizes the user and associates subsequent activity on the platform with the user. When an account does not exist, the platform must create one by guiding the user through an account creation process to generate the username and the password. These actions are centralized on the database managing the users of the platform. During a surge of network traffic to the platform, queries to the user database also increase and cannot easily be offloaded or distributed to protect the database.

The term "server" has its ordinary meaning. Generally, a server provides computational services in a request-response model where in response to a request (sometime referred to as a "call") over a network, the server performs some computational action and sends a response back to the requesting computer. As used herein, a "backend call" refers a request by an interface operating on the computing device of a customer to a non-static network resource (e.g., a server, a database, etc.). A "backend call" generally requires the server(s) of the commerce platform to process the request and generate information to be sent to the requester that is responsive to the contents of the request. For example, the backend call may require a query into an inventory database to determine status of inventory associated with the offer. Though the intensity can vary, backend calls are relatively computationally intensive to network resources. The terms "network storage" and "cloud storage" have their ordinary meaning. Generally, network storage provides object storage through a web service interface to facilitate remote storage and retrieval of data objects. As used herein, a "static call" refers to a request to a static network resource, such as networked storage that stores data objects (e.g., visual elements for an interface, scripts to be executed by the interface, offer packages, etc.). Static calls are relatively computationally inexpensive. As used herein, an "offer instantiator" refers to a document designed to be processed in a web browser that includes (i) a structure (e.g., written in HTML code, etc.) necessary to render a cart interface, (ii) a location of where to receive a related offer package (e.g., from networked storage), and (iii) a location to receive a instantiating script to render the cart interface using the structure and the offer package.

A merchant that desires to make an offer via a surge traffic resistant commerce platform ("commerce platform") generates an offer package through the commerce platform. The offer package contains information necessary to render a cart interface and browse inventory associated with the offer without making backend calls to the commerce platform or any inventory management system tracking the inventory associated with the offer. The package may be, for example, generated in a data-interchange format. The package is then stored on one or more static network storage devices. To communicate the offer, the commerce platform creates a link (e.g., a Uniform Resource Locator (URL), etc.) that points to an address that contains the location of the offer package, the location of the instantiating script to render the cart interface, and a minimum amount of code (e.g., HTML, etc.) necessary to use the instantiating script to render the cart interface.

When a consumer activates the link, the consumer's browser fetches the offer package and the instantiating script to render the cart interface (e.g., by generating browser readable code, etc.) on the commuting device executing the browser. That is, instead of a server (e.g., one of the servers of the commerce platform) generating the cart interface and then sending the browser readable code defining the cart interface to the browser, the computing device of the customer generates the browser readable code for the cart interface using the instantiating script and based on the offer package. In such a manner, when a surge of customers are simultaneously or near simultaneously interacting with the cart interface, a corresponding surge of traffic is not generated directly at the servers of the commerce platform and those servers are not overwhelmed by the resulting processing to generate and update the cart interface. The cart interface includes an action button. The browser generated cart interface performs pre-checkout cart management functions using the resources of the browser without making inventory or checkout related backend calls to the servers of the commerce platform until the action button is activated (e.g., "clicked on") by the customer. These pre-checkout cart management functions include browsing inventory (e.g., names, descriptions, and/or prices of inventory available through the offer, etc.), receiving an indication of the type and/or quantity that the customer desires to purchase, and/or calculating an estimated total cost of the indicated type and quantity. Because the package includes all of the inventory information (e.g., offer details, identities and descriptions of inventory available with the offer, price, etc.), the cart interface performs these pre-checkout functions without making any backend calls. Thus, a surge of customers browsing inventory, many of whom are not likely to complete a purchase, does not create a corresponding surge in network traffic or server load for the commerce platform. From time-to-time, the marching may asynchronously regenerate the offer package to change any part of the offer, including available inventory, the theme or template, etc., to replace the previous package at the same location in the static network storage. Thus, the merchant may dynamically update the cart interface without causing a surge of network traffic or server load.

When the customer activates the action button, the browser renders, based on the offer package, a checkout interface and makes a backend call that includes the identities and quantities of the inventory in the current cart of the cart interface. This backend call causes one of the servers to calculate the actual (e.g., non-estimated) cost, including the unit cost of each item and any associated fees, to the items in the cart and report that total to the checkout interface. The customer may change quantities (e.g., add quantities, subtract quantities, delete items, etc.) in the checkout interface.

Each changes results in the backend call to calculate the total cost of the items. These price calculations are performed without querying the inventory management system of the merchant. Thus, a large number of such backend calls does not result in an increased load on the merchant's inventory management system. In some examples, these backend calls are configured to be computationally light to reduce any strain on the servers of the commerce platform.

When the browser receives the calculation, the checkout interface displays the total. The checkout interface performs a redirect to a payment processor. In some examples, this causes the payment processor to instantiate one or more payment electronic widgets (e.g., a Google® Pay widget, an Apple® Pay widget, etc.) and/or a credit card payment widget in the checkout interface. Interacting with one of the electronic payment widgets or the credit card payment widget (e.g., providing payment credentials, etc.) causes the payment processor to generate a payment intent that places a hold on funds equal to the calculated amount. Up to this point, the merchant platform does not make any call to the inventory management system of the merchant. After the payment processor signals that the payment intent was successful, the commerce platform attempts to place a reserve on the items with the inventory management system of the merchant. When the inventory management system signals that the attempt to reserve the inventory was successful, the commerce platform initiates one or more authenticity/security checks with the customer via the checkout interface. When all of the authenticity/security checks are successful, the commerce platform requests that the inventory management system place the reserved items be in a fulfillment status. The commerce platform then signals the payment processor to complete the transaction based on the purchase intent. The commerce platform then performs post-purchase fulfillment actions via the checkout interface. In such a manner, the commerce platform minimizes network traffic, server load, and load on the inventory management system by only generating such activity when the customer has affirmatively signaled their desire to complete a transaction and only to the extent necessary for their current level of commitment.

In many instances, users that interact with a platform will do so in a manner such that their identity or a proxy for their identity needs to be associated with their interactions. Logging into the platform requires that the user be authorized and authenticated. However, the database that supports a user being authorized and authenticated to a particular account on the platform needs to be protected during periods of surges of network traffic that are the result of legitimate traffic intended for the platform. Additionally, a high user throughput is important so that traffic generating users are processed quickly as the surge of traffic progresses so that, for example, users causing network traffic early in the surge of network traffic can be processed quickly to mitigate a buildup of user generated traffic. To authorize and identify a user, a user interface requests two identifiers from a user. The identifiers do not need to be present in that combination in a user database. The identifiers are linked to other methods of communicating with the user, such as a mobile number, an email address, and/or an instant messenger name, etc. The platform determines whether the identifiers are present in that combination in the user database. The user account is indexed to the combination of identifiers such that any account with either one of the two identifiers in combination with any other identifier would be a different account. Simultaneously with the account lookup, (i) the platform presents a first authorization challenge to the user based on the first identifier and (ii) sends a first one-time password (OTP) to the user via the first identifier. When the user correctly enters the first OTP into the authorization challenge interface, the platform presents a second authorization challenge to the user based on the second identifier and (ii) sends a second one-time password (OTP) to the user via the second identifier. When the user correctly enters the second OTP into the authorization challenge interface and when the user account exists that is associated with both identifiers, the platform authorizes the user and associates activity on the platform with the user. When the user correctly enters the second OTP into the authorization challenge interface and when the user account that is associated with both identifiers does not exist, the platform creates the account, authorizes the user, and associates activity on the platform with the user. In such a manner, the platform does not need to check a user generated password already associated with an account, can distribute to other servers the authorization functions, and perform authentication functions in parallel. This reduces the burden on the user database and increases the throughput of user that generate traffic towards the platform.

FIG. 1 is a block diagram of an example system 100 to provide an electronic commerce platform 102 to manage a surge network traffic. In the illustrated example, the commerce platform 102 is communicatively coupled to the merchant networks (e.g., merchant network 104) and payment processors 106. The commerce platform 102 is also communicatively coupled to one or more webservers 108 (e.g., physical servers, virtual servers, and/or virtualized containers, etc.) and one or more network storage devices 110 (e.g., Amazon® S3, Google® Cloud Storage, Azure® Blob Storage, IBM® Cloud Object Storage, etc.). Data objects stored in the network storage devices 110 may be pushed onto network storage devices 112 that is part of a content delivery network (CDN) 114 to be accessed by browsers operating on computing devices 116 (e.g., desktop computers, laptop computers, smart phones, tablets, smart televisions, etc.). The commerce platform 102 facilitates generation of offer instantiators 118 and offer packages 120 by a merchant to offer goods and/or services managed by the merchant network 104 through the commerce platform 102.

The commerce platform 102 includes a transaction application programming interface (API) 122, a packager 124, an authentication manager 125, and a customer database 126. While in the illustrated example, the transaction API 122, the packager 124, the customer database 126, and the webservers 108 are illustrated as being conceptually grouped in a certain configuration for simplicity, these components may be otherwise situated in any suitable manner (e.g., on cloud servers, etc.). The transaction API 122 facilitates communication between the webservers 108, the payment processor 106, the merchant network 104, and the customer database 126. The packager 124 receives input from the merchant to generate the offer instantiator 118 and the offer package 120 using software bricks 128. In some examples, the package 124 generates the offer package 120 in a data-interchange format (e.g., JavaScript Object Notation (JSON), Extensible Markup Language (XML), YAML, etc.). The software brick 128 are offer package components that define the parameters, metadata, available inventory and/or audiovisual assets of the offer and the interrelationship between these parameters, metadata, available inventory and/or audiovisual assets. The Customer database 126 stores customer information to facilitate assigning an order from a checkout interface in a browser to a particular account or accounts for security and fulfillment purposes.

The structure and organization of the offer package 120 are dictated by which bricks are used to generate the offer package 120.

Using the packager 124, the merchant defines the offer and provides an inventory data object (e.g., a two dimensional array, etc.) that specifies the available inventory for the offer and attributes of the inventory the merchant uses to distinguish the inventory. For example, the data object may include a row for each seat in a venue that is to be part of the offer and a column for the section, a column for the row, and a column for the seat. The packager 124 generates a unique link (e.g., a URL link, etc.) that instructs a browser where to locate the offer instantiator 118. The offer package 120 contains the information necessary for the offer instantiator 118, when accessed by a browser, to render the cart interface and the checkout interface, including a description of the available inventory to facilitate a customer browsing the inventory through the cart interface, without making any backend calls to the webservers 108 and/or the transaction API 122. After the offer instantiator 118 and offer package 120 are created, the packager 124 publishes the instantiator 118 onto the webservers 108 and pushes the offer package 120 onto the networked storage 110 and 112. The link to the instantiator 118 may then be provided to customers. In the illustrated example, the instantiator 118 is located on a server and is accessible via a domain that is controlled/operated by the commerce platform 102. Alternatively, in some examples, the instantiator 118 may be located on a server and accessible via a domain that is controlled/operated by another party (e.g., the merchant network 104, a third party, etc.).

The merchant may, from time-to-time, rebuild the offer package 120 with new and/or updated parameters, metadata, available inventory and/or audiovisual assets of the offer. When the offer package 120 is rebuilt, the packager 124 pushes the updated offer package to replace the old offer package in the networked storage 110 and 112. In such a manner, the merchant can dynamically and asynchronously update the offer package 120 while customers access the offer instantiator 118 without interruption.

The example merchant network 104 includes an inventory interface 130 and an inventory database 132 (collectively may be referred to as an "inventory management system" or "IMS"). The inventory interface 130, using the inventory database 132, provides the inventory data object. The inventory interface 130 may also manipulate the inventory in the inventory database 132 by, for example, changing the status of the inventory (e.g., reserving the inventory, marking the inventory for fulfillment, etc.). In some examples, the inventory interface 130 may limit the frequency at which the packager can request a refresh of the inventory data object.

When a consumer activates the link to the offer instantiator 118, the consumer's browser performs a static call to retrieve the offer package 120 and the instantiating script to render the cart interface (e.g., by generating browser readable code, etc.) from the network storage 110 and 112. The browser then renders the cart interface by executing the instantiating script using the offer package 120. The browser generated cart interface performs pre-checkout cart management functions using the resources of the browser. These pre-checkout cart management functions include browsing inventory (e.g., names, descriptions, and/or prices of inventory available through the offer, etc.) as defined by the inventory data object (e.g., as processed by the bricks 128).

When the customer activates the action button, the browser renders, based on the offer package 120, a checkout interface and makes a backend call that includes the identifiers (sometimes referred to as "inventory unit identifiers") that identify inventory in the current cart of the cart interface and quantities of the inventory in the current cart of the cart interface. This backend call causes one of the servers 108 to calculate the actual (e.g., non-estimated) cost, including the unit cost of each item and any associated fees, to the items in the cart and report that total to the checkout interface. The customer may change quantities (e.g., add quantities, subtract quantities, delete items, etc.) in the checkout interface. Each change results in the backend call to the servers 108 to calculate the total cost of the items.

When the browser receives the calculation, the checkout interface displays the total. The checkout interface performs a redirect to the payment processor 106. In some examples, this causes the payment processor 106 to instantiate one or more payment electronic widgets (e.g., a Google® Pay widget, an Apple® Pay widget, etc.) and/or a credit card payment widget in the checkout interface. Successfully credentialing through one of the electronic payment widgets or the credit card payment widget causes the payment processor 106 to generate a payment intent that places a hold on funds equal to the calculated amount. After the payment processor 106 signals that the payment intent was successful, the transaction API 122 attempts to place a reserve on the items with the inventory management system. When the inventory management system signals that the attempt to reserve the inventory was successful, the transaction API 122 initiates one or more authenticity/security checks with the customer via the checkout interface. When all of the authenticity/security checks are successful, the transaction API 122 requests that the inventory management system place the reserved items in a fulfillment status. The transaction API 122 then signals the payment processor 106 to complete the transaction based on the purchase intent. The transaction API 122 then performs post-purchase fulfillment actions via the checkout interface.

The authentication manager 125 manages authentication of users and protects the customer database 126 from negative effects of surges in network traffic that result in frequent queries into the customer database 126. For example, the authentication manager 125 may limit queries into customer database 126 (e.g., by only making queries into the data base after the user has been authenticated) and/or may offload authentication actions to other services. The customer database 126 includes a customer index and various other pieces of information used to track the actions of the user (e.g., a transaction history, etc.) and/or fulfill goods and/or services ordered through the platform (e.g., a mailing address, a billing address, an email address, etc.). The customer index consists at least two identifiers. The identifiers are associated with methods of independently communicating with the user through communication media other than the commerce platform 102 that the user has control over and access to. For example, the identifiers may be an email address, a mobile phone number, and/or an instant messenger handle, etc. The customer index that points to a particular customer record is a unique combination of the at least two identifiers. A customer index with less than all of the identifiers is a different customer index. For example, a customer index of [email: ehendrickson@gmail.com; mobile: 2025550106] is different than the customer index of [email: ehendrickson@gmail.com; Telegram: @e*hendrickson].

To complete a transaction as described herein, the authentication manager 125 must authenticate the user. This authentication process verifies that the user is a person (i.e., not a computer program), that the person is identifiable to the commerce platform 102, and the user has access to communication means associated with the provided identifiers. The browser, using the instantiating script used to instantiate the cart interface, presents one or more interfaces that include authorization challenges to the user. In some examples, the authorization challenge interfaces request the at least two identifiers and then request the user enter a secret for each identifier. The secret may be a one-time passcode (e.g., a HMAC-based One-time Password algorithm (HOTP) code, a Time-based One-time Password Algorithm (TOTP) code, a SMS or email-based one-time password (OTP) code, etc.) and/or a code provided by a USB or embedded chip based key (sometimes referred to as a "smartcard" or a "security token"), etc. The request for the user to enter the secret for each identifier may be presented serially or at the same time (e.g., on the same interface). The authorization manager 125 authorizes the user when the secret matches the expected input for each identifier.

The authorization manager 125 may direct and delegate functions described herein to authorization services 134 operating on the servers 108. The authorization services 134 may be deployable over a group of the servers 108 to distribute the computational load caused by the surge of network traffic. When the user provides the identifiers, the authorization manager 125 (or one of the authorization services 134) generates the secret (e.g., the OTP) and sends the secret to the user using the identifier. For example, the authorization manager 125 may send an email, an SMS text message, an instant messenger message, etc. that contains the OTP. After the user inputs the secret into the authorization challenge interface, the authorization manager 125 determines whether the user has passed or failed the authorization challenge by comparing the entered secret to the expected secret.

The authorization manager 125 queries the customer database 126 with the identifiers to determine whether a customer index exists for the user within the customer database 126. In some examples, the authorization manager 125 performs this query in parallel with generating and sending the secrets for the identifiers so that when the user is authorized, the authorization manager 125 is ready to associate the current transaction with the customer index if it exists and create a new customer index to associate the current transaction if it does not exist. Alternatively, in some examples, the authorization manager 125 performs this query after the user has been authorized so that the authorization manager 125 does not query the customer database 126 until the user is authorized (e.g., users that eventually never get authorized do not cause queries into the customer database 126). In such examples, the authorization manager 125 only performs a query into the customer database 126 after the user has been authorized, not as part of the authorization process. Additionally, in such examples, the authorization process is performed independently of the contents of the customer database 126. That is, in such examples, the contents of the customer database 126 may be accessed to determine what to do once the user is authorized (e.g., associate a transaction with a customer index, etc.), but are not directly used to perform the task of authorization.

Figure 2:
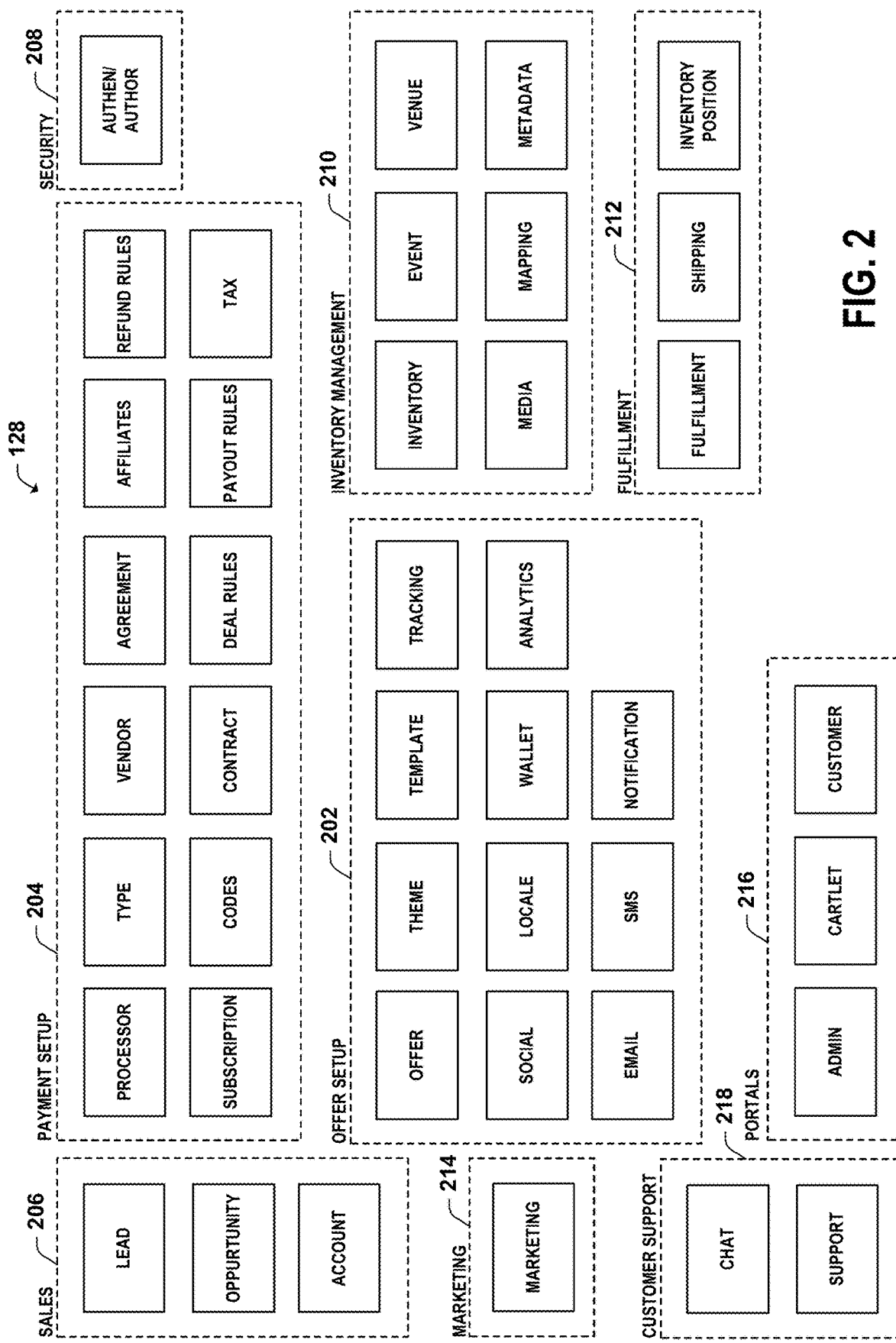
FIG. 2 is a conceptual diagram of bricks used to construct a package used to manage the surge network traffic, according to the teachings of this disclosure.

FIG. 2 illustrates examples of the bricks 128 used to define and construct the offer package 120. The bricks 128 are software structures that define the parameters, metadata, available inventory and/or audiovisual assets of the offer, the interrelationship between these parameters, metadata, available inventory and/or audiovisual assets, and the syntax of the data interchange format in which the package 120 is being created. When creating the offer package, the merchant may select the relevant bricks 128 to define the look and feel, the functionality, inventory management and grouping, and the order flow associated with the cart interface that is rendered using the offer package 120 constructed using the bricks 128 selected and populated by the merchant. The bricks 128 facilitate building the offer package 120 so to include the necessary parameters, metadata, available inventory and/or audiovisual assets of the offer and/or tokens point to the parameters and/or metadata to perform front end actions (e.g., the computing device 116 rendering the cart interface for the offer) and to perform backend actions (e.g., handle payment, refunds, fund allocation, customer service, etc.). In the illustrated example, the bricks 128 are arranged in thematic groups. However, the bricks 128 may be arranged in any manner. For example, when the packager 124 packages the selected bricks 128, into the offer package 120, the resulting structure of the offer package 120 mirrors the bricks 128. In some examples, the bricks 128 define interface elements that translate the structure of the bricks into interactable objects within a interface to design an offer. The interactable objects have inputs that facilitate receiving the information necessary to render the components of, for example, the cart interface and define relationships between the bricks 128. As such, as bricks 128 are added to an offer, a corresponding interface in an offer editor is generated.

In the illustrated example of FIG. 2, a group of bricks 128 is classified in an offer setup group 202. The bricks 128 in the offer setup group 202 are used to build the look and feel of the cart interface as well as the operation of the cart interface related to the specific offer. A group of bricks 128 is classified in a payment setup group 204. The bricks 128 in the payment setup group 204 are used to define rules for a transaction made of the specific offer and establish a transactional route and history for every good and/or service purchased through the offer. A group of bricks 128 is classified in a sale group 206. The bricks 128 in the sales group 206 interface with external customer, lead generation, and account databases to connect offers to the merchant and facilitate merchant account management. The offer setup group 202, the payment setup group 204, and the sales group 206 contribute structure and metadata to the offer package 120 to facilitate forensically tracing and justifying any transaction that is made according to the offer package 120 and to supply a system with information to complete a transaction while minimizing the transaction's use of back-end calls.

In the illustrated example, a group of bricks 128 is classified in a security group 208. Bricks 128 in the security group 208 provide parameters and metadata used by the authentication manager 125 to perform the authorization challenges to authenticate a customer. The authentication/authorization brick 208, for example, may store the parameters and metadata that determine the type and/or form of the identifiers to be input by the customer (e.g., email address, mobile number, instant messenger handle, social media handle, etc.), the user interface(s) used to enter the identifiers and the associated secrets, the type and/or form of the secrets (e.g., whether numeric or alphanumeric, length, etc.), and/or timing that dictates how long the secrets are valid, etc. In some examples, there may be multiple versions of the authentication/authorization brick 208 that may be selected by the merchant 104, where parameters are predefined.

A group of bricks 128 is classified in an inventory management group 210. Bricks 128 in the inventory management group 210 provide parameters and metadata for slicing and presenting inventory in the cart interface and interfacing with the inventory management system of the merchant. A group of bricks 128 is classified in a fulfillment group 212. Bricks 128 in the fulfillment group 128 provide parameters and metadata for fulfilling and delivering inventory after a successful transaction. A group of bricks 128 is classified in a marketing group 214 to provide support to attributing sales of goods and/or services to parties involved in completing the transaction (e.g., first party or third party sales agents, etc.). A group of bricks 128 is classified in a portals group 216. Bricks 128 in the portals group 216 provide top level structure to packages, including the offer package 120. A group of bricks 128 is classified in a customer support group 218 that includes structure, parameters, and metadata to render a customer support interface and to process customer support requests while minimizing the number of backend calls the customer's browser performs.

Figure 3:
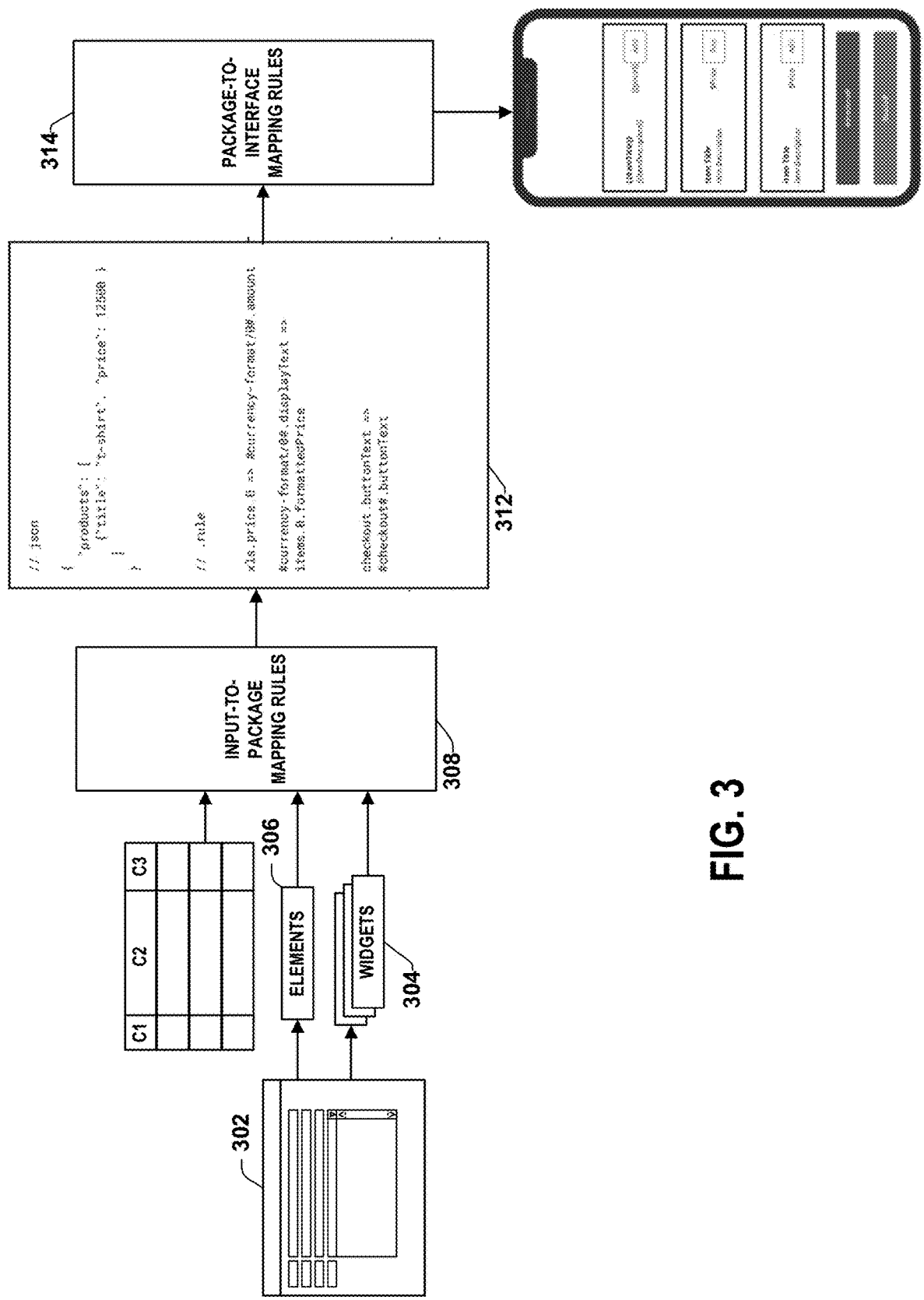
FIG. 3 is a conceptual diagram of the packager of FIG. 1 generating an offer package, according to the teachings of this disclosure.

FIG. 3 is a conceptual diagram of the packager 124 of FIG. 1 generating an offer package 120. In the illustrated example, a packager interface 302 facilitates editing of the contents of the offer package 120. The packager interface 302 includes selectors to facilitate selection of which bricks 128 (e.g., and which subbricks, etc.) to use to generate the offer package 120 and edit the parameters and metadata associated with each of the selected bricks 128. These selectors may be graphical elements that are dragged and moved in the packager interface 302 to select the bricks 128 and to define relationships between the bricks 128. For example, the bricks 128 may specify different widgets 304, different quantity pickers, different themes, different templates, define audio and/or visual assets to be used, different ways to slice inventory, and/or settings for the authentication manager 125, etc. (collectively referred to as "elements 306"). The merchant 104 may use the packager interface 302 to specify the parameters of the authentication/authorization brick 208. The widgets 304 define interactive interface elements in the cart interface that causes the hosting browser to perform an action that reaches externally from the browser. For example, one widget 304 may define the parameters (e.g., size, shape, position, label, etc.) of the action button. As another example, one widget 304 may define which third party payment processor to send information to facilitate instantiation of the payment processor's payment interface in the checkout interface.

In the illustrated example of FIG. 3, the packager 124 includes input-to-package mapping rules 308 that transform the widgets 304, the elements 306, and, in the illustrated example, the inventory 302 expressed in a two-dimensional table into the data interchange formatted file 312 for the offer package 120. The mapping rules 308 map the inventory 302 and information defined by and through the bricks 128 (e.g., the widgets 304 and the elements 306, etc.) into the syntax of the data interchange format such that all of the data required to build the cart interface and the checkout interface, all of the data to perform cart management functions (e.g., displaying inventory being offered, prices, and descriptions; manipulating quantities in the cart; estimating total price, etc.) are included in the offer package 120. For example, the mapping rules 308 map the parameters and metadata of the authentication/authorization brick 208 into the syntax of the data interchange formatted file 312. When the authentication manager 125 handles authentication for a transaction that is based on a particular offer package 120, the authentication manager 125 by, for example, looking up the particular offer package 120, will know how to authorize the user that initiated that transaction.

In the illustrated example, the data interchange formatted file 312 is a process with package-to-interface rules 314 that specify how the elements will be graphically laid out by the cart interface and/or checkout interface based on, for example, the selected theme and template bricks and the target browser in which the interfaces will be created. For example, the data interchange formatted file 312 may be processed by different sets for package-to-interface rules 314 to generate different versions of the offer package 120, where the offer initiator 120 causes the browser to download one of the versions of the offer package 120 based on the qualities of the browser. For example, a set of package-to-interface rules 314 may generate one offer package 120 for browsers operating on mobile devices (e.g., smart phones, smart watches, etc.), one offer package 120 for browsers operating on computing devices (e.g., desktop computers, tablets, laptop computers, etc.), and one offer package for browsers operating on mixed reality devices (e.g., virtual reality headsets, augmented reality headsets, etc.). Because the input-to-package rules 308 are processed separately from the package-to-interface mapping rules 314, the rules sets 308 and 314 can be updated asynchronously. That is, the template bricks may be updated and the update will be implemented the next time the offer package 120 is republished.

Figure 4:
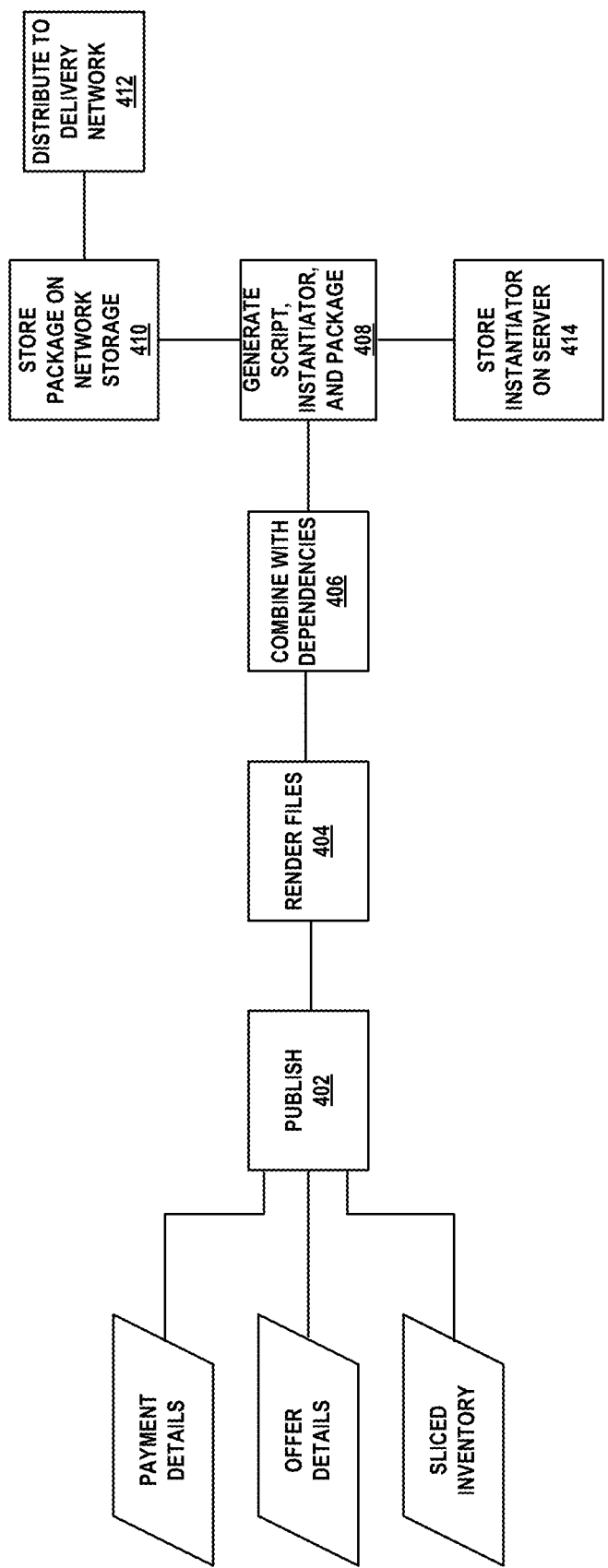
FIG. 4 is a conceptual diagram of the commerce platform of FIG. 1 publishing the offer package, according to the teachings of this disclosure.

FIG. 4 is a conceptual diagram of the commerce platform 102 of FIG. 1 publishing the offer package 120 and the offer instantiator 118. At block 402, the entity using the commerce platform 102 (e.g., the merchant 104, etc.) indicates that the offer instantiator 118 and/or the offer package 120 should be published. For example, a "publish" button may be provided in the packager interface 302. At block 404, the packager 124 renders the offer package 120. In some examples, the packager 124 renders the offer package 120 in accordance to the process described in connection with FIG. 3 above. The packager 124 may perform this rendering multiple times to generate offer packages 120 to be used by different browsers. At block 406, the packager 124 retrieves dependencies that are specified by the bricks 128 used to create the offer package 120. The dependencies may be, for example, libraries, audio and/or visual files (e.g., as designated by the selected template brick, the selected theme brick, and/or the selected quantity picker brick, etc.), and/or link paths (e.g., URLs, etc.), etc. Because bricks 128 can be updated asynchronously, dependencies that may have changed since the last time the offer package 120 was published automatically have those dependencies updated in an offer package when it is republished. At block 408, the packager 124 generates the offer package(s) 120, the instantiating script used by the browser to generate the cart and checkout interfaces, and the offer instantiator 118 to be distributed. In some examples, the packager 124 may perform versioning of the offer package(s) 120 and the instantiating script each time the offer package(s) is/are republished. The offer instantiator 118 may be changed to point the browser to the updated instantiating script and/or updated offer package(s) 120 when the browser refreshes. At block 410, the packager 124 stores the instantiating script, the offer package(s) 120, and/or any assets necessary to render the cart interfaces to the network storage 110. At block 412, the packager 124 causes the instantiating script, the offer package(s) 120, and/or the assets to be distributed to the networked storage 112 in the CDN 114. In some examples, the packager 124 sends a signal to the CDN 114 invalidating the current cache, which causes the network storage 112 in the CDN 114 to update to the latest files. At block 414, the offer instantiator 118 is moved to the server(s) 108 to be accessed by the computing devices 116.

Figure 5:
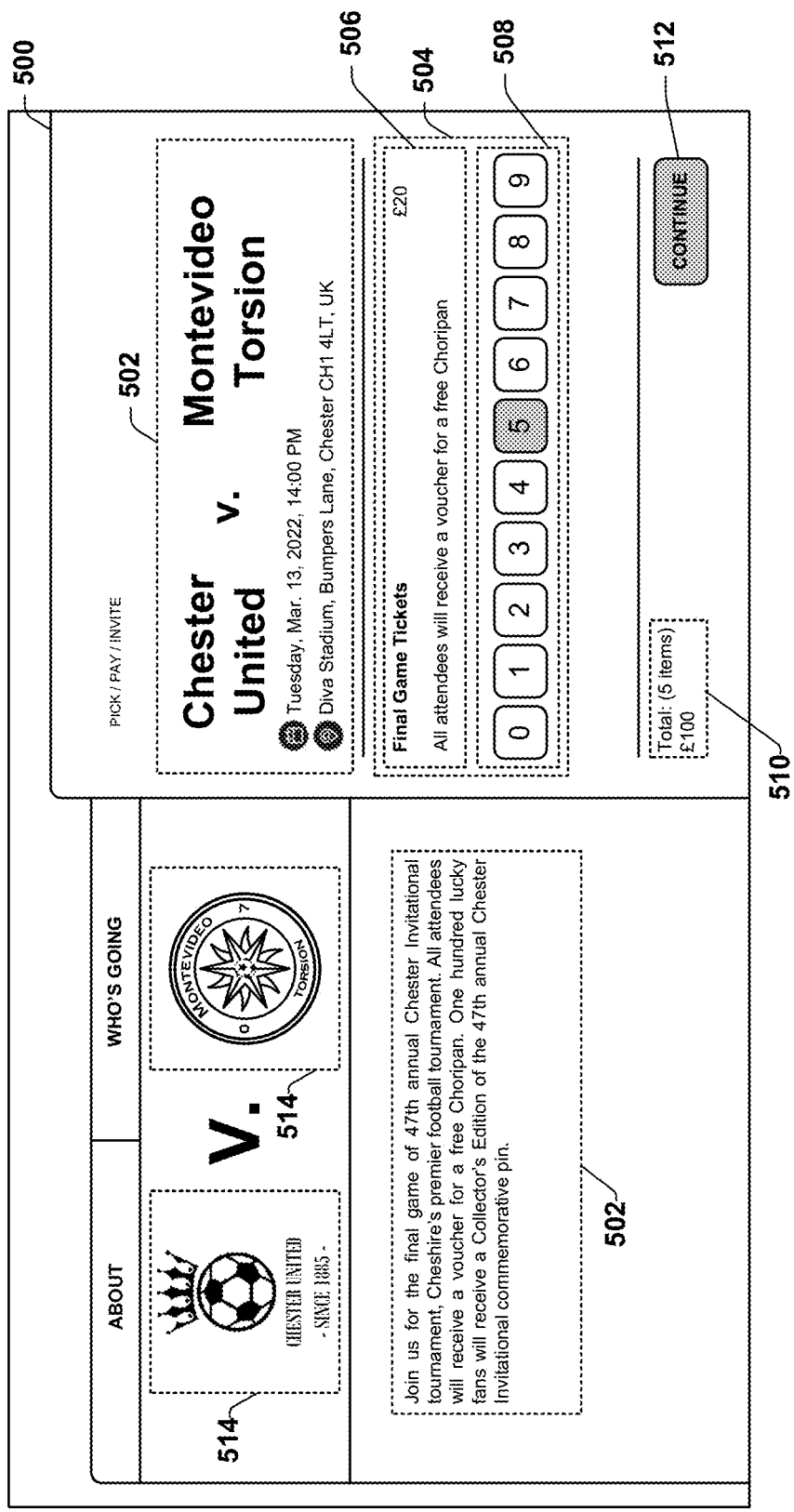
FIG. 5 illustrates example cart interfaces, according to the teachings of this disclosure.

FIG. 5 illustrates an example cart interface 500, generated by a browser in response to being directed to the offer instantiator 118 based on the instantiating script and the offer package 120. Once the instantiating script and offer package 120 are loaded in the browser, the instantiating script generates the code and makes the necessary calls to instantiate the cart interface 500 and perform cart management functions without making a backend call. In the illustrated example, the cart interface 500 includes high level description 502 of the inventory and an inventory item 504 for each piece of inventory being offered. While for illustrative purposes, when only one inventory item 504 is shown, cart interface 500 may include as many inventory items 504 as are defined in the offer package 120. In some examples, the offer package 120 may define inventory items 504 in a nested or hierarchical manner. For example, inventory items 504 for goods may be initially displayed as a list of types of goods that, when clicked, reveal the inventory items 504 that fit within that type of good. As another example, for event tickets, the cart interface 500 may initially display sections, where each row within a section is an inventory item 504. The inventory item 504 includes a description 506 of the inventory being offered as a quantity picker 508. The quantity picker 508 is a graphical interface that facilitates selecting a quantity of the inventory item 504. The quantity picker 508 may take different form depending on which of the quantity picker bricks was chosen while the offer package 120 was created. When the quantity of items in the quantity picker 508 is changed, the browser, without making a backend call, estimates the total amount based on the information in the offer package 120 and displays the estimated total in the total field 510. Because this calculation is done entirely within the browser: (a) the calculation is quick, and (b) the manipulation of the inventory in the cart interface 500 does not result in traffic being directed to the commerce platform 102 and does not result in any queries into the IMS of the merchant 104. Using the instantiating script, based on the offer package 120, this cart management is repeated until the customer interacts with the action button 512. In this manner, the customer may browse the inventory items 504 and add items to the cart without any traffic being directed at the commerce platform 102.

The look and feel of the cart interface 500 is dictated by the selected template brick and the selected theme brick. The template brick dictates how the instantiating script, in conjunction with the offer package 120, generates code to define the layout of elements 502, 504, 506, 508 510, 512, and 514 within the cart interface 500. If, during block 402 of FIG. 4, the merchant were to select a different template brick or if the template brick definition changed (e.g., changes that would take effect in block 406 of FIG. 4), when the customer refreshes the browser, the instantiating script, in conjunction with the offer package 120, would generate a changed layout. The selected theme brick dictates the aesthetic look and feel (e.g., color, audio visual assets 512, etc.). If, during block 402 of FIG. 4, the merchant were to select a different theme brick or the theme brick definition changed (e.g., changes that would take effect in block 406 of FIG. 4), when the customer refreshes the browser, the instantiating script, in conjunction with the offer package 120, would generate a different look and feel of the cart interface 500.

The cart interface 500 is different from the checkout interface. The cart interface 500 does not, until the action button 512 is interacted with, provide a method for the browser, during the course of the user browsing the inventory, to perform backend calls. Thus, in the cart interface 500, selecting and deselecting inventory (e.g., via the quantity picker 508) does not result in network traffic directed towards the commerce platform 102. Additionally, in some examples, actually purchasing the selected inventory cannot be accomplished through the cart interface 500 (e.g., purchasing is gated by proceeding to the checkout interface, etc.) As a result, a large number of users can simultaneously interact with a cart interface 500 instantiated entirely in their own browser without causing any network traffic to be directed towards the commerce platform 102. The checkout interface facilitates the browser receiving a calculation of actual cost of the selected inventory (via low processing-load backend calls to the commerce platform 102) and initiating a purchase of the inventory (via interaction with a checkout button). Until an actual purchase of inventory is initiated (e.g., the user interacting with the checkout button), the checkout interface does not cause any queries into the IMS database 132.

FIGS. 6A, 6B, and 6C illustrate an example authorization interfaces 600A, 600B and 600C. In the illustrated examples, the authentication manager 125 receives identifiers and the secrets (e.g., one-time passcode, etc.) associated with the identifiers via the authorization interfaces 600A, 600B and 600C. FIG. 6A illustrates the entry authorization interfaces 600A that provides identifier fields 602A and 602B for the user to enter identifiers of the specified type. The authentication manager 125 does not determine whether or not the identifier previously exist in the combination entered in the identifier fields 602A and 602B in the customer database 126 before proceeding. The combination of identifiers is not checked against the records in the customer database 126. From the user's perspective, the progression through the authorization interfaces 600A, 600B and 600C is the same whether such a record exists or not. In the illustrated example, the entry authorization interfaces 600A also provides name fields 604A and 604B for the user to provide one or more of a given name, a surname, and/or a middle name.

FIG. 6B illustrates a first challenge authorization interface 600B that corresponds with the identifier entered in one of the identifier fields 602A and 602B (e.g., the first identifier field 602A). In the illustrated example, the first identifier field 602A is a mobile number. The first challenge authorization interface 600B provides secret entry field(s) 606A to facilitate the user entering the secret (e.g., one-time password, etc.) received via the means connected to the identifier entered into the first identifier field 602A. For example, when the first identifier is a mobile number, the user may receive an SMS message that contains a limited duration one-time password to be entered into secret entry field(s) 606A. As another example, when the first identifier is a mobile number, the user may receive a seed value to be entered into an authentication program to generate a one-time user code. FIG. 6C illustrates a second challenge authorization interface 600C that corresponds with the identifier entered in one of the identifier fields 602A and 602B (e.g., the second identifier field 602B). The second challenge authorization interface 600C provides secret entry field(s) 606B to facilitate the user entering the secret (e.g., one-time password, etc.) received via the means connected to the identifier entered into the second identifier field 602B. For example, when the second identifier is an email address, the user may receive an email that contains a limited duration one-time password to be entered into secret entry field(s) 606B.

Figure 7A:
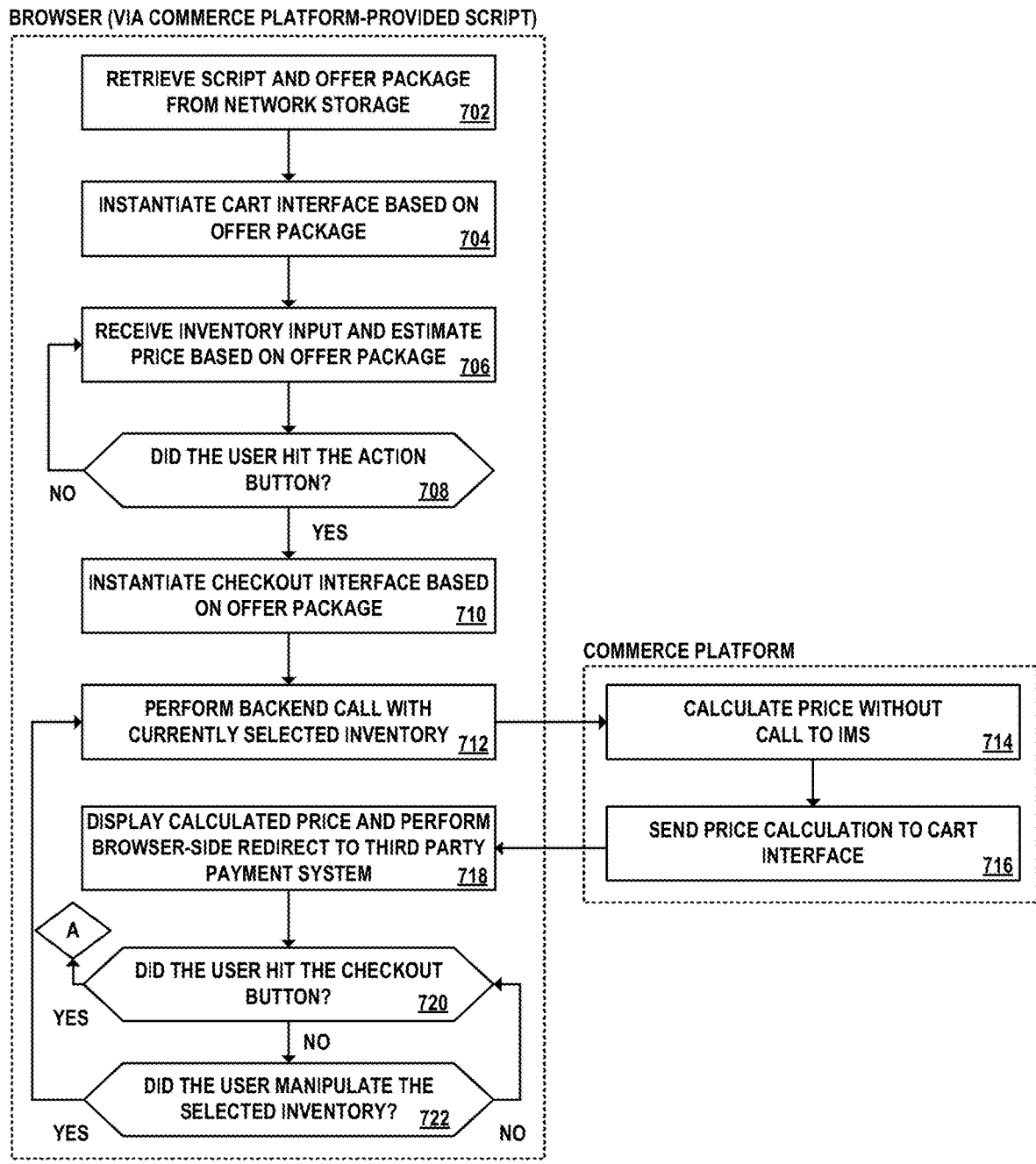
FIGS. 7A and 7B illustrate an example method to provide for a network traffic surge resistant platform, according to the teachings of this disclosure.
Figure 7B:
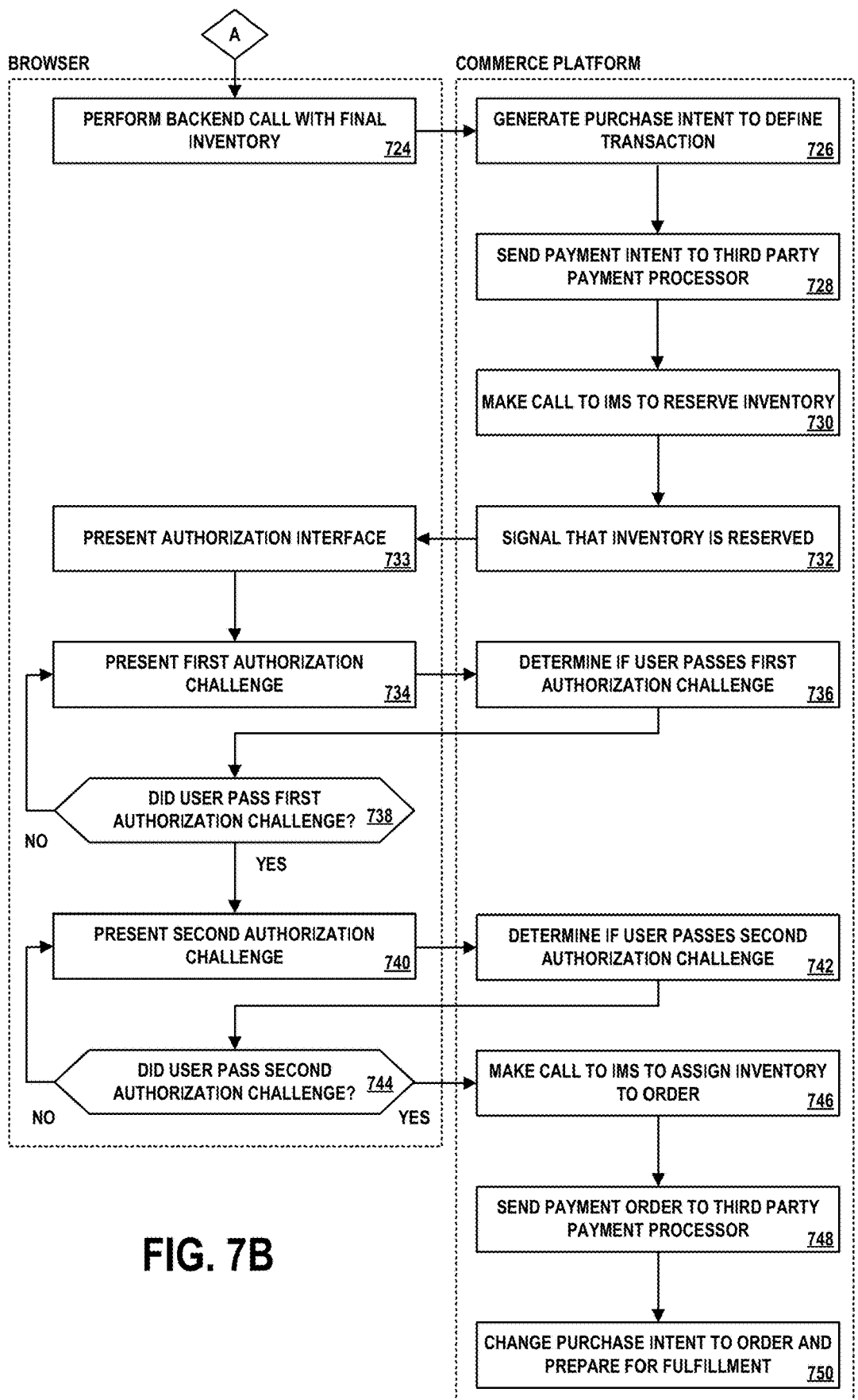

FIGS. 7A and 7B illustrate an example method to provide for a network traffic surge resistant platform. The method begins when a user loads the offer instantiator 118 into a browser. For example, the user may click on a URL that directs the browser to the offer instantiator 118. Generally, the method minimizes traffic generated towards the commerce platform 102 and queries to the IMS database 132 until the user has demonstrated that greater network traffic and database resource allocation is appropriate. Interface generation (e.g., cart interface 500 of FIG. 5, etc.) and initial cart management are performed by the browser using the processing and memory power of the computing device 116.

Initially, the browser, based on the instructions provided by the offer instantiator 118, retrieves the instantiating script and offer package 120 from the network storage 112 in the CDN 114 (block 702). The distributive nature of the network storage 112 in the CDN 114, coupled to the relatively low processing and network intense activity of retrieving the instantiating script and offer package 120, means that a network traffic surge is not directed at the commerce platform 102, even when a large number of users load the offer instantiator 118 into their browser. The browser, executing the instantiating script, instantiates the cart interface in the browser based on the offer package 120 without making any backend calls to the commerce platform 102 (block 704). The browser receives inventory input (e.g., by manipulation of the quantity picker 508, etc.) and estimates the price of the selected inventory based on the offer package 120 without making any backend calls that result in queries to the IMS (block 706). The estimated price may be displayed in the total field 510 of the cart interface 500. The browser waits until it receives an inventory input or the user interacts with the action button 512 (block 708). When the browser receives an inventory input ("NO" at block 708), the browser estimates the price of the selected inventory based on the offer package 120 without making any backend calls that result in queries to the IMS (block 706).

When the browser detects that the user interacts with the action button 512 ("YES" at block 708), the browser, using the instantiating script, instantiates the checkout interface based on the offer package 120 (block 710). The user may return to the cart interface (e.g., return to block 704) at any point. The browser, based on the instantiating script, performs a backend call to the commerce platform 102 that includes the currently selected inventory of the cart interface (block 712).

The commerce platform 102, in response to receiving the backend call, calculates a price for the currently selected inventory based on the offer package 120 without generating a query to the IMS of the merchant 104 (block 714). The offer package 120 may include obscured and/or encrypted data that commerce platform 102 is able to unobscure and/or decrypt related to costs beyond the price of the inventory. For example, the commerce platform 102 may calculate the price of the inventory, any fees specified/allowed by the contract with the merchant 104, and/or taxes to be levied on the purchase. This is a relatively low processing cost calculation. The commerce platform 102 returns the calculated price to the browser that issued the backend call (block 716).

The browser, using the instantiating script, displays the calculated price in the checkout interface and performs a browser-side redirect (sometimes referred to as a "client-side redirect") to the third party payment processor(s) 106 to provide the calculated price (block 718). This allows one or more payment interfaces of the third party payment processor(s) 106 to instantiate within the checkout interface and facilitate payment for the selected inventory. This browser-side redirect means that the resources of the browser, not the commerce platform 102, are used to provide the information necessary for the payment interface(s) to instantiate. Thus, if the user does not proceed with checking out, the network resources used by the user towards the commerce platform 102 have been minimal and no IMS database 132 resources have been expended because of the user.

The browser, using the instantiating script, determines whether the user interacts with the checkout button (block 720). When the user does not interact with the checkout button ("NO" at block 720), the browser, using the instantiating script, determines whether the user manipulated the selected inventory in the checkout interface (block 722). When the user manipulates the selected inventory ("YES" at block 722), the browser, based on the instantiating script, performs a backend call to the commerce platform 102 that includes the currently selected inventory of the cart interface (block 712). When the user does not manipulate the selected inventory ("NO" at block 722), the browser determines whether the user interacts with the checkout button (block 720). When the user interacts with the checkout button ("YES" at block 720), the browser, using the instantiating script, performs a backend call that includes the selected inventory (block 724 of FIG. 7B).

The commerce platform 102 generates a purchase intent to define the transactions (block 726). The purchase intent is a record of an offer identifier, a browser identifier, an order identifier, a price, and inventory to be purchased, etc. that facilitates tracking an order beginning from the offer instantiator 118 and the offer package 120 to the checkout process such that any transaction can be audited. The purchase intent is linked to the information necessary to verify the content of the transaction. The commerce platform 102 sends a payment intent to the third party payment processor 106 (block 728). The payment intent may cause the third party payment processor 106 to collect payment information from the user (e.g., via the payment processor widget, etc.) and/or place a hold on funds sufficient to pay the calculated cost. The commerce platform 102 then makes a call to the IMS of the merchant 104 to place a reserve on the selected inventory (block 730). The reserve temporarily prevents the entries in the inventory database 132 representative of the inventory from being reserved or otherwise purchased. The commerce platform 102 then signals to the browser that the inventory is reserved (block 732).

The browser, using the instantiating script, presents the entry authorization interface 600A (block 733). Upon entry of identifiers in the identifier fields 602A and 602B, the browser, using the instantiating script, presents a first authorization challenge via the first challenge authorization interface 600B (block 734). In some examples, the authorization challenges are by entry of a secret received via and tied to the corresponding identifier (e.g., a mobile application-based one-time passcode (e.g., a HMAC-based One-time Password algorithm (HOTP) code, a Time-based One-time Password Algorithm (TOTP) code, etc.), a SMS or email-based one-time password (OTP) code, a code provided by a USB or embedded chip based key (sometimes referred to as a "smartcard" or a "security token", etc.). Upon entry of the answer to the first authorization challenge via the first challenge authorization interface 600B, via the instantiating script, the browser forwards the entry to the commerce platform 102 to determine if the user passes the first authorization challenge.

The commerce platform 102 determines whether the entry provided by the user passes the first authorization challenge and forwards this determination to the browser (block 736).

The user passes the first authorization challenge when, for example, the secret entered via the first challenge authorization interface 600B matches the expected secret (e.g., the secret via the medium associated with the first identifier).

The browser, using the instantiating script, determines whether the user passed the first authorization challenge (e.g., it received the pass signal from the commerce platform 102) (block 738). When the user does not pass the first authorization challenge ("NO" at block 738), the browser again presents a first authorization challenge (block 734). For example, the user may fail the first authorization challenge by entering a mismatched set of credentials, by entering the wrong OTP, and/or waiting too long to enter the OTP. In some examples, the browser, using the instantiating script, may limit the number of times the first authorization challenge may be attempted before, for example, transmitting a message to the commerce platform 102 to end the transaction (e.g., revoking the payment invent and unreserving the inventory, etc.). When the user does pass the first authorization challenge ("YES" at block 738), the browser, using the instantiating script, presents a second authorization challenge via the second challenge authorization interface 600C (block 740). For example, the user may pass the first authorization challenge by entering the secret associated with the identifier. The second authorization challenge requires entry of a different secret than the first authorization challenge that has a different source different than the secret information of the first authorization challenge. For example, the first authorization challenge may be entry of an OTP received from a SMS message and the second authorization challenge may be entry of a different OTP received from an email. In some examples, the authorization challenges may be structured such that they may be performed without the user having an account or prior relationship with the commerce platform 102. In some examples, the first authorization challenge may require entry on a mobile phone number to which the commerce platform 102 sends a first OTP and the second authorization challenge may require entry of an email address to which the commerce platform 102 sends a second OTP. In such examples, these credentials (e.g., the mobile number and email address) may be associated with the purchase intent such that future fulfillment requires entry of the same mobile number-email address pair (e.g., in response to subsequent authorization challenges at the time of fulfillment, etc.). Although two authorization challenges are described herein, there may be fewer (e.g., one) or more (e.g., three or more) authorization challenges. Upon entry of the answer to the second authorization challenge, via the instantiating script, the browser forwards the entry to the commerce platform 102 to determine if the user passes the second authorization challenge.

The commerce platform 102 determines whether the entry provided by the user passes the second authorization challenge and forwards this determination to the browser (block 742). The user passes the second authorization challenge when, for example, the secret entered via the second challenge authorization interface 600C matches the expected secret (e.g., the secret via the medium associated with the second identifier).

The browser, using the instantiating script, determines whether the user passed the second authorization challenge (e.g., it received the pass signal from the commerce platform 102) (block 744). When the user does not pass the second authorization challenge ("NO" at block 744), the browser again presents a second authorization challenge (block 740). In some examples, the browser, using the instantiating script, may limit the number of times the second authorization challenge may be attempted before, for example, transmitting a message to the commerce platform 102 to end the transaction (e.g., revoking the payment invent and unreserving the inventory, etc.).

When the user passes the second authorization challenge ("YES" at block 744), the commerce platform 102 makes a call to the IMS of the merchant 104 to the selected inventory to be fulfilled (block 746). The commerce platform 102 sends a payment order to the third party payment processor (block 748). The payment order causes the third party payment processor to complete the financial transaction based on the payment intent. The commerce platform changes the purchase intent to a purchase order and prepares for fulfillment (e.g., perform post fulfillment tasks, such as gathering shipping information, etc.) (block 750).

Figure 8:
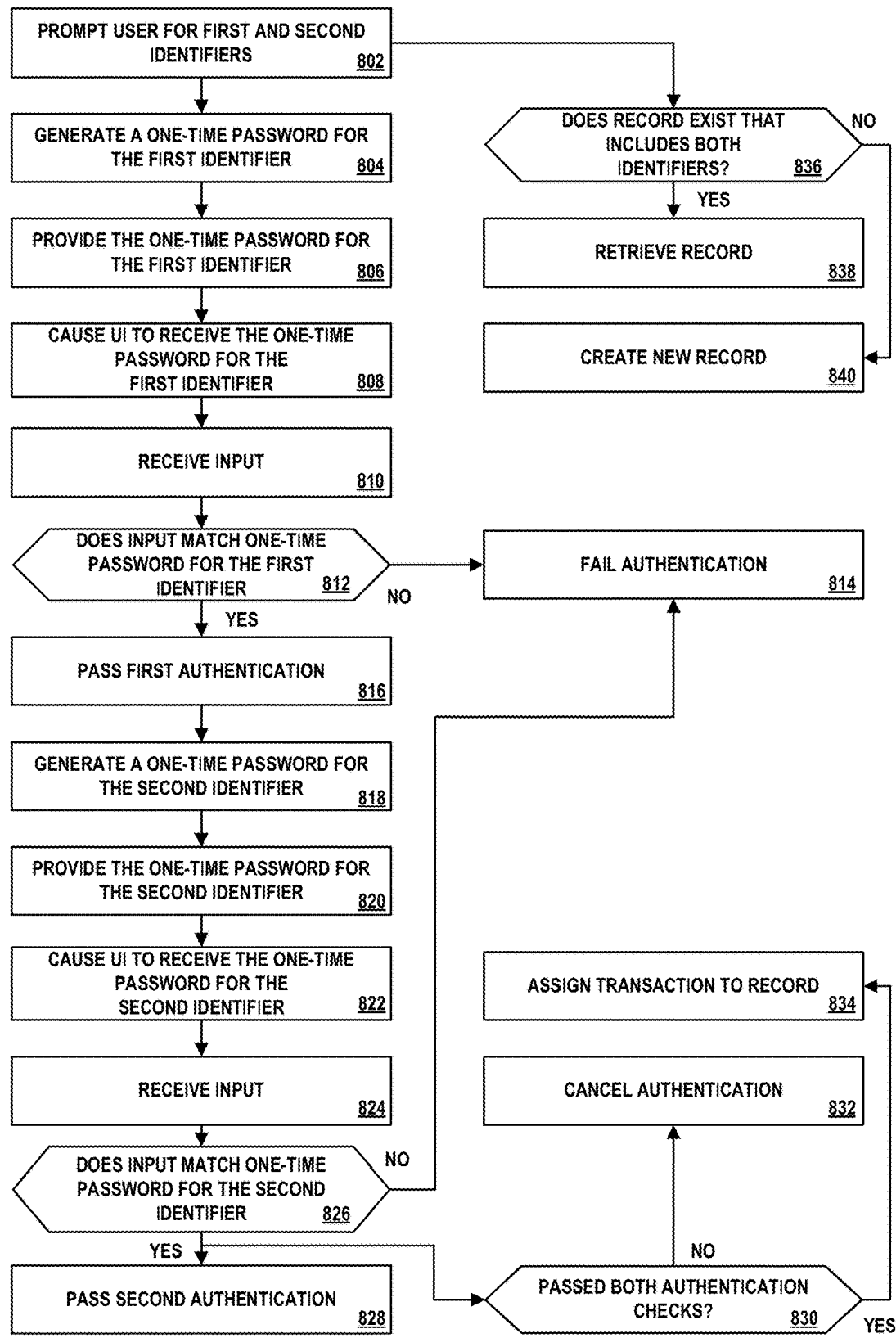
FIG. 8 illustrates an example method to perform authorization for a network traffic surge resistant platform, according to the teachings of this disclosure.

FIG. 8 illustrates an example method to perform authorization for the commerce platform 102. Initially, the browser, using the instantiator script and the offer package 120, provides the entry authorization interfaces 600A to prompt entry of the identifiers into the identifier fields 602A and 602B (block 802). The offer package 120 may, for example, specify the type of identifiers to be requested via the entry authorization interfaces 600A. Upon receipt of the identifiers, the authentication manager 125 and/or one of the authorization services 134 operating on the servers 108 generates a first OTP for the first identifier (e.g., the identifier entered into the first identifier field 602A) (block 804). The authentication manager 125 and/or one of the authorization services 134 provides the first OTP via the medium associated with the first identifier (block 806). For example, the one of the authorization services 134 may interface with an SMS system to send the first OTP to a mobile device using the first identifier (in this example, a mobile number). As another example, a different one of the authorization services 134 may interface with an email system to send the first OTP to an email account using the first identifier (in this example, an email address). As another example, a different one of the authorization services 134 may interface with an instant messaging system to send the first OTP to a messenger using the first identifier (in this example, an instant messenger handle).

The browser, using the instantiating script, provides for entry of the first OTP via the first challenge authorization interface 600B (block 806). In some examples, the browser, using the instantiating script, provides the first challenge authorization interface 600B immediately after receiving the identifiers even if the first OTP has not been generated yet. The authentication manager 125 waits for input into the first challenge authorization interface 600B to be communicated by the browser (block 808). Upon receipt, the authentication manager 125 determines whether an entry into the secret entry field(s) 606A of the first challenge authorization interface 600B matches the first OTP (block 810). The authentication manager 125 also tracks the pass/fail status of the user through the two authentication challenges so to only authorize the user (e.g., and the associated transaction) if the user passes both of the authentication challenges. If it does not match ("NO" at block 812, the authentication manager 125 reports that the authentication has failed (e.g., sends a fail signal to the browser) (block 814). When it does match ("YES" at block 812), the authentication manager 125 reports that the authentication has passed (e.g., sends a pass signal to the browser) (block 816).

The authentication manager 125 and/or one of the authorization services 134 operating on the servers 108 generates a second OTP for the second identifier (e.g., the identifier entered into the second identifier field 602B) (block 818).

The authentication manager 125 and/or one of the authorization services 134 provides the second OTP via the medium associated with the first identifier (block 820). The browser, using the instantiating script, provides for entry of the second OTP via the second challenge authorization interface 600C (block 822). The authentication manager 125 waits for input into the second challenge authorization interface 600C to be communicated by the browser (block 824). Upon receipt, the authentication manager 125 determines whether an entry into the secret entry field(s) 606B of the second challenge authorization interface 600C matches the second OTP (block 826). If it does not match ("NO" at block 824), the authentication manager 125 reports that the authentication has failed (e.g., sends a fail signal to the browser) (block 814). When it does match ("YES" at block 826), the authentication manager 125 reports that the authentication has passed (e.g., sends a pass signal to the browser) (block 828).

Additionally, when the entry into the secret entry field(s) 606B of the second challenge authorization interface 600C matches the second OTP, the authentication manager 125 determines whether both authentication challenges pass (block 830). If either one of the authentication challenges fail ("NO" at block 830), the authentication manager 125 cancels the authentication and does not allow the corresponding transaction (block 832). When both authentication challenges pass ("YES" at block 830), the authentication manager 125 authorizes the user and allows the corresponding transaction (block 834). The authentication manager assigns the transaction to a record in the customer database 126 (block 834).

In parallel or serial to block 804 to block 828, the authentication manager 128 queries the customer database 126 for a record that corresponds to both of the identifiers (block 836). When a record exists that that corresponds to both of the identifiers ("YES" at block 836), the authentication manager retrieves or otherwise references that record to assign to the transaction (e.g., at block 834) (block 838). When a record does not exist that corresponds to both of the identifiers ("NO" at block 836), the authentication manager 125 creates a record to assign to the transaction (e.g., at block 834) (block 840).

Although the embodiments of the present invention have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The terms "includes," "including," and "include" are inclusive and have the same scope as "comprises," "comprising," and "comprise" respectively. The claims, as follows, are intended to include all modifications and alterations insofar as they come within the scope of the claims or the equivalent thereof

Having thus described the invention, the following is claimed:

1. A network traffic surge resistant system comprising:
   network storage; and
   one or more servers configured as a commerce platform including an authentication manager, the commerce platform configured to:
      generate a script, an offer package, and an offer instantiator;
      store the script and the offer package onto the network storage, the offer instantiator providing the location of the script and the offer package in the network storage;
   wherein, in response to a browser operating on a computing device accessing the offer instantiator, causing, by the offer instantiator, the browser to retrieve the script and the offer package from the network storage;
   wherein, in response to a signal from the commerce platform, causing, by the script and based on the offer package, the browser to instantiate an authorization interface to receive entry of first and second identifiers and first and second input codes; and
   wherein the authentication manager is configured to:
      generate a first secret code and send the first secret code via a first communication medium associated with the first identifier;
      generate a second secret code and send the second secret code via a second communication medium associated with the second identifier; and
      in response to determining the first input code matching the first secret code and the second input code matching the second secret code, authorize a transaction associated with the browser and associate the transaction with a customer record associated with both the first and second identifiers.

2. The system of claim 1, wherein the authentication manager is configured to query a customer database for the customer record using the first and second identifiers to query the customer database.

3. The system of claim 2, wherein the authentication manager is configured to:
   generate and send the first secret code at a first time;
   generate and send the second secret code at the first time; and
   query the customer database at a second time after the first time, the second time being (a) after determining that the first input code matches the first secret code and the second input code matches the second secret code and (b) before the authentication manager authorizes a transaction.

4. The system of claim 2, wherein authentication manager is configured to generate and send the first secret code at a first time, generate and send the second secret code at the first time, query the customer database at substantially the same time.

5. The system of claim 2, when (a) the first input code matches the first secret code and the second input code matches the second secret code, and (b) the customer record associated with the first and the second identifiers does not exist in the customer database, the authentication manager is configured to create the customer record associated with the first and the second identifiers.

6. The system of claim 1, wherein the first communication medium is a first type of communication medium and the second communication medium is a second type of communication medium that is different than the first type.

7. The system of claim 6, wherein the first type of communication medium is a mobile network and the first identifier is a mobile number, and the second type of communication medium is email and the second identifier is an email address.

8. The system of claim 1, wherein the authentication manager is configured to, in response to determining that the first input code does not match the first secret code or the second input code does not match the second secret code, cancel the transaction and perform inventory management to release inventory associated with the transaction.

9. The system of claim 1, wherein the first and second secret codes are generated without first determining whether the customer record associated with the first and second identifiers exists within the customer database.

10. The system of claim 1, wherein to cause the browser to instantiate the authorization interface, the script generates instructions, using the resources of the computing device, for the browser to execute based on the offer package.

11. A method to provide a surge resistant online platform comprising:
    generating, by the online platform including an authorization manager, a script, an offer package, and an offer instantiator, and storing the script and the offer package onto the network storage, the offer instantiator providing the location of the script and the offer package in the network storage;
    retrieving, by a browser operating on a computing device at the direction of the offer instantiator, the script and the offer package from the network storage;
    in response to a signal from the commerce platform, instantiating, by the script operating in the browser, an authorization interface to receive entry of first and second identifiers and first and second input codes;
    generating, by the authorization manager or a first authorization service coupled to the authorization manager, a first secret code and send the first secret code via a first communication medium associated with the first identifier;
    generating, by the authorization manager or a second authorization service coupled to the authorization manager, a second secret code and send the second secret code via a second communication medium associated with the second identifier; and
    in response to determining the first input code matching the first secret code and the second input code matching the second secret code, authorizing, by the authorization manager, a transaction associated with the browser and associating the transaction with a customer record associated with both the first and second identifiers.

12. The method of claim 11, further including querying, by the authentication manager, a customer database for the customer record using the first and second identifiers to query the customer database.

13. The method of claim 12, wherein:
    the first secret code is generated and sent at a first time;
    the second secret code is generated and sent at the first time; and
    the customer database is queried at a second time after the first time, the second time being (a) after determining that the first input code matches the first secret code and the second input code matches the second secret code and (b) before the authentication manager authorizes a transaction.

14. The method of claim 12, wherein generating and sending the first secret code at a first time, generating and sending the second secret code at the first time, querying the customer database at substantially the same time.

15. The method of claim 12, when (a) the first input code matches the first secret code and the second input code matches the second secret code, and (b) the customer record associated with the first and the second identifiers does not exist in the customer database, creating, by the authentication manager, the customer record associated with the first and the second identifiers.

16. The method of claim 11, wherein the first communication medium is a first type of communication medium and the second communication medium is a second type of communication medium that is different than the first type.

17. The method of claim 16, wherein the first type of communication medium is a mobile network and the first identifier is a mobile number, and the second type of communication medium is email and the second identifier is an email address.

18. The method of claim 11, wherein in response to determining that the first input code does not match first secret code or the second input code does not match the second secret code, canceling, by the authentication manager, the transaction and performing inventory management to release inventory associated with the transaction.

19. The method of claim 11, wherein the first and second secret codes are generated without first determining whether the customer record associated with the first and second identifiers exists within the customer database.

20. The method of claim 11, wherein to cause the browser to instantiate the authorization interface, the script generated instructions, using the resources of the computing device, for the browser to execute based on the offer package.

* * * * *